United States Patent [19]

Harris et al.

[11] Patent Number: 4,613,159
[45] Date of Patent: Sep. 23, 1986

[54] PRESSURE-ASSISTED DYNAMIC SEAL APPARATUS

[75] Inventors: Allen E. Harris; David D. Szarka, both of Duncan, Okla.

[73] Assignee: Halliburton Company, Duncan, Okla.

[21] Appl. No.: 664,907

[22] Filed: Oct. 26, 1984

[51] Int. Cl.$^4$ ............................................. F16L 17/02
[52] U.S. Cl. ....................................... 285/3; 285/101; 285/106; 285/139; 285/187; 285/302; 285/351; 285/900; 277/116.2; 277/123
[58] Field of Search ..................... 285/3, 95, 100, 101, 285/106, 111, 187, 139, 140, 302, 351, DIG. 1; 166/115, 116; 277/113, 114, 116.2, 116.4, 120, 123

[56] References Cited

U.S. PATENT DOCUMENTS

| | | | |
|---|---|---|---|
| 3,433,506 | 3/1969 | Crowe | 285/302 |
| 3,630,533 | 7/1970 | Butler | 285/187 |
| 3,647,245 | 3/1972 | Hanes | 285/106 |
| 3,976,130 | 8/1976 | Chambless | 285/187 |
| 3,984,131 | 10/1976 | Gingrich | 285/302 |
| 4,106,779 | 8/1978 | Zabcik | 285/351 |
| 4,146,253 | 3/1979 | Celommi | 285/302 |
| 4,327,804 | 5/1982 | Reed | 285/302 |
| 4,381,868 | 5/1983 | Croy | 285/140 |
| 4,390,063 | 6/1983 | Wells | 285/302 |
| 4,512,410 | 4/1985 | Forester | 285/106 |

Primary Examiner—Cornelius J. Husar
Assistant Examiner—Eric K. Nicholson
Attorney, Agent, or Firm—James R. Duzan

[57] ABSTRACT

A pressure-assisted dynamic seal mechanism for sealing two relatively movable members within a tubing string in a well includes a primary seal member having a first cross-sectional area positioned for sealing engagement between the two relatively movable members. The primary seal is pressure-assisted by a back-up seal mechanism comprising a second seal member having a cross-sectional area greater than the cross-sectional area of the primary seal member and a third seal member having a cross-sectional area greater than the cross-sectional area of the second seal member. The pressures which act directly across the primary seal member also act in the same direction across the third seal member, whereas these pressures act in an opposite direction across the second seal member. This construction provides a net compressive force provided by the back-up seal mechanism against the primary seal member when the pressure differential acts in a direction tending to compress the primary seal member against the two relatively movable members. This seal mechanism can be used with an expansion joint used in high temperature environments.

17 Claims, 8 Drawing Figures

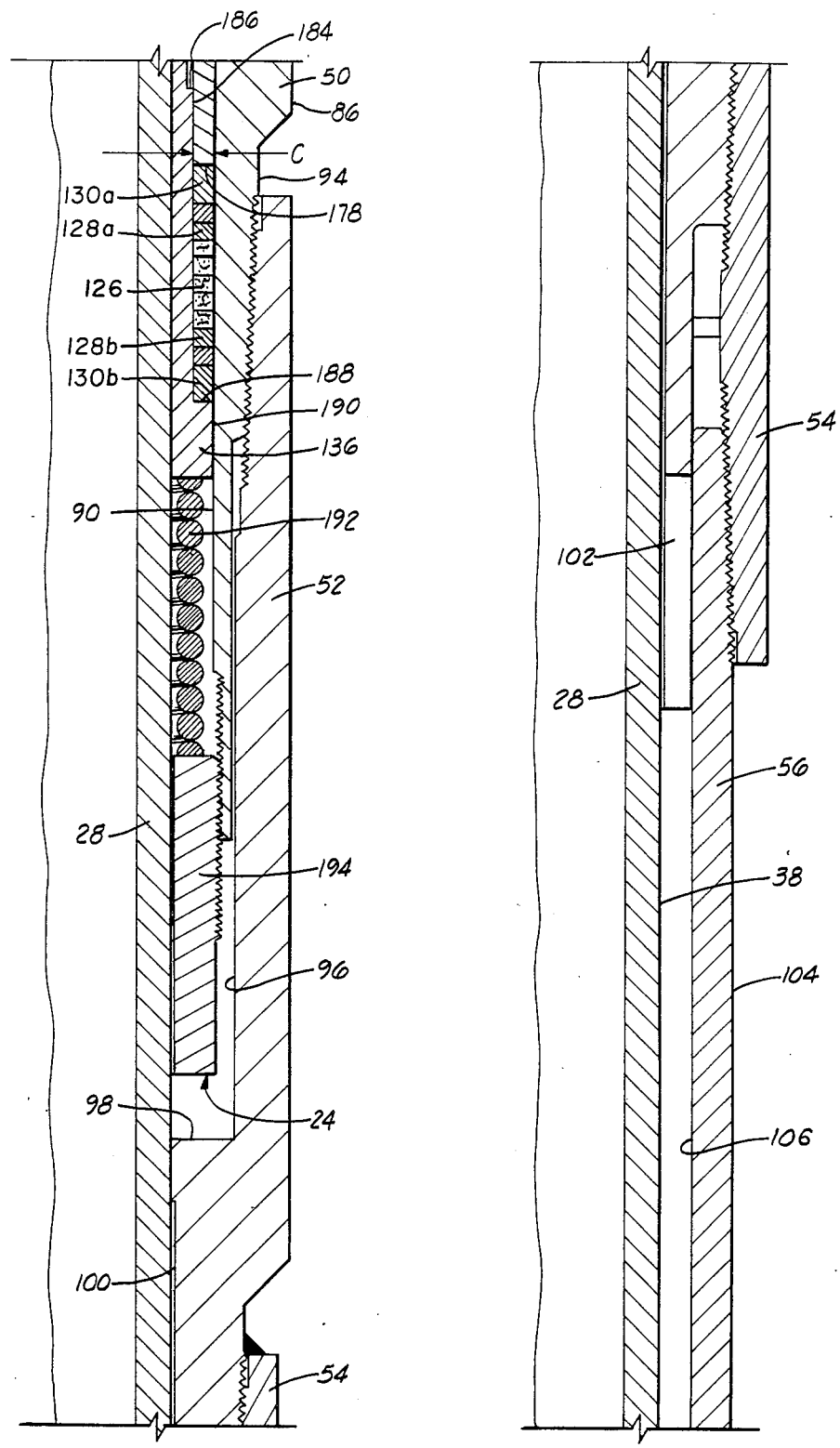

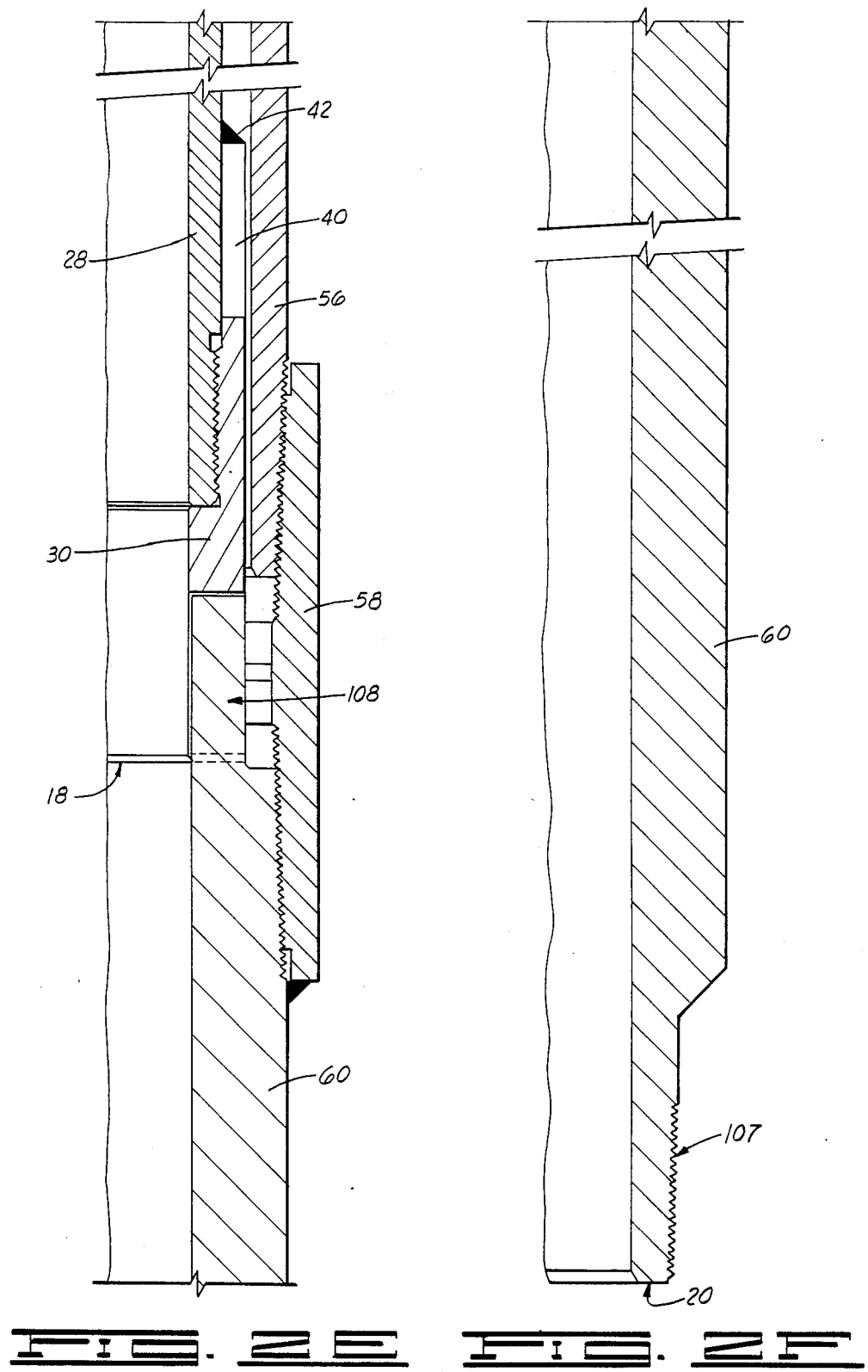

PRESSURE-ASSISTED DYNAMIC SEAL APPARATUS

BACKGROUND OF THE INVENTION

This invention relates generally to pressure-assisted dynamic seal apparatus used to provide a seal between two relatively movable elements disposed in a downhole environment and more particularly, but not by way of limitation, to pressure-assisted dynamic seal apparatus included in an expansion joint connected in a tubing string disposed in a high temperature environment, such as found in geothermal or steam injection wells.

In the petroleum industry, movable parts found in a tubing string, for example, need seals therebetween to prevent fluid communication between the outside of the tubing string and the interior of the string. Because such a seal is subjected to forces exerted when the parts are moved relative to each other, the substance used to effect the seal is abraded whereby the seal tends to be degraded.

In an attempt to alleviate this seal loss, prior art sealing members have been preloaded, such as by a compression spring, so that a force continually acts to compress the sealing substance as it wears. For example, in high temperature environments where elastomeric substances cannot be used to provide the sealing boundary, a single packing gland of graphite impregnated asbestos rope packing, such as Rabestos Manhatan RM 325, has been used. This material does not have the inherent resiliency of an elastomeric substance; therefore, an external mechanical compressive force is required to achieve and maintain a pressure seal. A spring mechanism has been used to provide this force. An adjustable packing nut, used with or without a spring, can also be used to establish the preload, as can a ratchet-type mechanism.

The mechanical compressive force, or preload, is not as efficient as an elastomer's inherent resiliency in maintaining a fluid-tight seal. This preload force is attenuated in a dynamic seal environment when the seal is subjected to relative movement between the sealed members because the packing material abrades or wears away. As more and more of the seal material wears away, there comes a point at which the preload force diminishes sufficiently to preclude continued maintenance of an adequate seal. This results in leakage that becomes progressively worse in a very short time, particularly in a high-pressure steam environment.

A specific use of this prior art single-gland seal is found in steam flood, "huff and puff" and geothermal recovery wells, for example, where the seal is disposed between the relatively movable parts of an expansion joint which is connected to, or is an integral part of, a packer used to isolate and protect the casing goods above one or more production zones. In such an environment, it is imperative that some means be provided to compensate for thermal expansion of the tubular goods carrying the packer. If such compensation is not made, the tubular goods can expand or contract sufficiently to cause a compression deformation (corkscrew) or tensile failure. In a "huff and puff" or steam injection well, temperature changes of 400° F. to 500° F. are possible. Such temperature changes can cause the tubing string to expand twenty to thirty feet, for example.

A known technique of compensating for such changes in tubing length is to run a downhole slip joint or expansion joint of sufficient length to make up for the anticipated length changes. Because such a joint is usually run as a part of or above the packer, it must provide a continuous seal between the inner and outer telescopically related members of the joint to prevent fluid communication between the interior of the tubing string and the annulus above the packer. Such a seal has been provided by the aforementioned preloaded single-gland seal.

Because the inner and outer members of the expansion joint must move to accommodate expansion or contraction due to temperature changes, the seal member between these two elements is referred to as a dynamic seal which is subject to abrasion and wear. The seal member is also likely to have voids because of corrosive pitting resulting from the exemplary steam environment in which such a seal can be used. Although the preload acts to compress the seal member to compensate for the lost, abraded substance and to fill or bridge the pits, the preload force becomes less as more and more material abrades. Seal leakage and failure occur as the preload diminishes below the point required to effect a seal.

From the foregoing, it is apparent that there is the need for a new type of sealing apparatus which does not degrade as rapidly as the aforementioned preloaded, single-gland seal apparatus. Such a new sealing apparatus should be usable in a variety of environments, but particularly in a high temperature environment. It should also maintain the integrity of the seal despite continued abrasion of the seal member providing the primary seal between the relatively movable elements of a dynamic seal. Furthermore, such a new type of sealing apparatus should provide a larger compressive force on the primary seal as the pressure differential between the interior of the apparatus and the exterior of the apparatus increases so that the seal is tightened with increasing pressure to avoid leakage. Furthermore, such a sealing apparatus should not lose any significant preload force even as the primary seal abrades or wears away.

SUMMARY OF THE INVENTION

The present invention overcomes the above-noted and other shortcomings of the prior art by providing a novel and improved pressure-assisted dynamic seal apparatus. The present invention functions in low and high temperatures and maintains a primary sealing boundary despite abrasion of the substance comprising the boundary. The present invention includes a preload which does not decrease to the extent exhibited in the prior art as the primary seal abrades. Furthermore, the present invention provides larger compressive forces on the primary seal as pressure increases so that the seal is more tightly effected.

Broadly, the present invention includes seal means for maintaining a seal between inner and outer members as the inner and outer members are moved relative to each other and as at least a portion of the seal means is abraded in response to such relative movement. The seal means includes a primary seal means, responsive to a compressive force, for engaging an outer surface of the inner member and an inner surface of the outer member. The seal means also includes back-up seal means, responsive to a pressure differential between an interior pressure inside of the inner member and an exterior pressure outside of the outer member, for exerting a net compressive force on the primary seal means when the interior pressure exceeds the exterior pressure. More particularly, the primary seal means includes a sealing substance and the back-up seal means includes second and third sealing substances. Acting on the first sealing substance in one direction is the exterior pressure and acting in another direction on the first sealing substance is the interior pressure. The exterior pressure acts on the second sealing substance in said another direction and on the third sealing substance in said one direction, whereas the interior pressure acts on the second sealing substance in said one direction and on the third sealing substance in said another direction. The seal means also includes biasing means for providing a biasing force initially comparable to the aforementioned preload force found in prior art seals.

In the preferred embodiment, the forces acting across a cross-sectional area of the first sealing substance are equal to $(P_i-P_o)$ (area A)$+P_i-P_o)$ (area C)$-(P_i-P_o)$ (area B), where "$P_i$" equals the interior pressure, "$P_o$" equals the exterior pressure, "area A" equals the cross-sectional area of the first sealing substance, "area B" equals the cross-sectional area of the second sealing substance, and "area C" equals the cross-sectional area of the third sealing substance.

Also in the preferred embodiment, the inner and outer members, which are movable relative to each other, include mating spline means for enabling the outer member to rotate when the inner member is rotated. This preferred embodiment also comprises frangible means for retaining the inner and outer members in a relatively fixed longitudinal relationship until the frangible means is broken.

Therefore, from the foregoing, it is a general object of the present invention to provide a novel and improved pressure-assisted dynamic seal apparatus. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIGS. 2A-2F comprise a partial sectional view of a preferred embodiment of the expansion joint incorporating the present invention.

DETAILED DESCRIPTION OF THE PREFERRED EMBODIMENT

Figure 1:
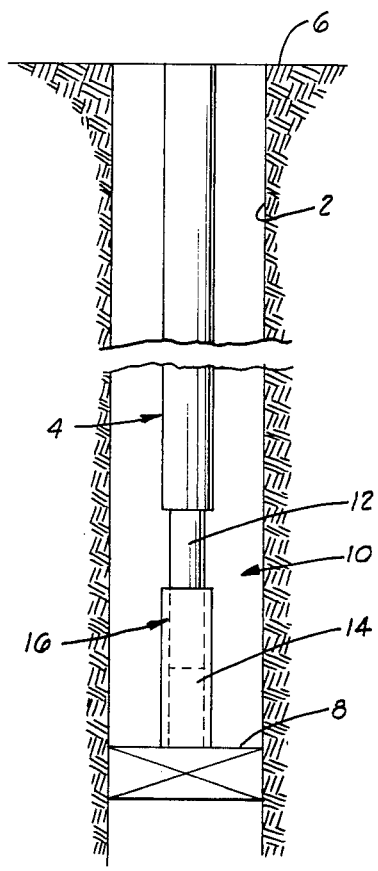
FIG. 1 is a schematic illustration showing a tubing string disposed in a well between the surface and a packer, which tubing string includes an expansion joint incorporating the present invention.

With reference to FIG. 1, an exemplary environment in which the present invention can be used will be described. FIG. 1 shows a well borehole 2, which will generally have casing disposed therein, having a tubing string 4 with one end connected at the surface 6 to a suitable structure as known in the art and with its other end connected to a packer 8 retained in the borehole 2 in a manner as known to the art.

The tubing string 4 includes an expansion joint 10 which is used to compensate for length changes in the tubing string 4 such as are brought about by temperature changes within the well. If such compensation were not made, the tubing string 4 could buckle or separate in tension because it is fixed at both ends.

The expansion joint 10 includes, broadly, two telescoping members with an inner member 12 fixed to the upper portion of the tubing string 4 and an outer member 14 fixed to, or an integral part of, the packer 8. To prevent fluid communication along the sliding surfaces of the expansion joint 10 between the fluid within the tubing string 4 (such as steam being pumped into the borehole 2 below the packer 8) and the fluid within the annulus above the packer 8 and outside of the tubing string 4, the expansion joint 10 needs a suitable dynamic seal located such as at a position 16 between the sliding surfaces. Heretofore, a preloaded single packing gland seal has been used for this purpose. To overcome the shortcomings of this type of seal, which shortcomings have been described hereinabove, the present invention provides an improved seal apparatus which is illustrated in FIGS. 2A-2F incorporated in an illustrated specific embodiment of the expansion joint 10. It is to be noted that the sealing mechanism of the present invention need not be limited to use in an expansion joint.

It is also to be noted that in the description of the present invention terms such as "up," "down," "above," and "below" refer to orientations as viewed in the drawings and as the preferred embodiment is disposed in a well. These terms are related to the longitudinal or axial direction of the generally elongated, cylindrical construction of the preferred embodiment. Terms such as "in," "out," and "radial" refer to directions transverse to the longitudinal or axial direction.

Referring to FIGS. 2A-2F, the preferred embodiment of the expansion joint and sealing mechanism of the present invention will be described. Broadly, the expansion joint and the sealing mechanism include an inner member 18 (FIGS. 2A-2E), an outer member 20 (FIGS. 2A-2F) having the inner member 18 slidably disposed therein so that the inner and outer members 18, 20 are movable relative to each other, frangible means 22 (FIG. 2A) for retaining the inner and outer members 18, 20 in a relatively fixed longitudinal relationship until the frangible means 22 is broken, and seal means 24 (FIGS. 2B-2C) for maintaining a fluid-tight seal between the inner and outer members 18, 20 as they are moved relative to each other and as at least a portion of the seal means 24 is abraded in response to such relative movement.

The inner member 18 of the preferred embodiment is a tubular mandrel means for receiving a fluid under pressure (e.g., steam which is injected through the tubing string 4 into the well or steam which is flowed into the tubing string 4 from the borehole below the packer 8). The pressure within the tubular mandrel means will be referred to as the tubing pressure, the tubing interior pressure, or the like. FIGS. 2A-2E show that the tubular mandrel means includes an upper adapter 26, an expansion tubing or mandrel 28 threadedly connected to the upper adapter 26, and an inner spline member 30 threadedly connected to the expansion tubing 28.

The upper adapter 26 has a body with interior surfaces defining a threaded box end and passageway which communicate with a similar passageway defined through the length of the expansion tubing 28. The body of the upper adapter 26 also has a cylindrical outer surface 32 from which extends a shoulder or flange portion having a radial annular surface 34 and an axial cylindrical surface 36 offset from the surface 32 by the surface 34.

The expansion tubing 28 comprises one or more elongated cylindrical tubes which substantially define the maximum length change that can be compensated by the expansion joint 10. In the preferred embodiment the tubing 28 has a cylindrical outer surface 38 having a constant diameter.

The inner spline member 30 has a body defining the spline, in which body there is defined a threaded box end which connects to the threaded pin end of the expansion tubing 28. The outer diameter of the expansion tubing 28 is less than the outer diameter of the body of the inner spline member 30. One of the splines is identified by the reference numeral 40, each of which splines is secured to the expansion tubing 28 by a weld bead 42.

When the frangible means 22 is broken, the inner member 18, comprising the upper adapter 26, the expansion tubing 28, and the inner spline member 30, is slidingly movable relative to the outer member 20.

The outer member 20 of the preferred embodiment defines a housing means for telescopically receiving interiorly thereof the inner member 18 and for receiving exteriorly thereof a fluid under pressure within the annulus defined between the tubing string 4 and the borehole 2. This pressure will be referred to as the annular pressure, the exterior or outer pressure, or the like. FIGS. 2A-2F show that this outer member or housing means includes a shear pin retainer member 44, a first seal housing 46 threadedly connected to the shear pin retainer member 36 and secured thereto by one or more set screws 48, a second seal housing 50 threadedly connected to the first seal housing 46, an upper spline member 52 threadedly connected to the second seal housing 50, an upper retaining collar 54 threadedly connected and welded to the upper spline member 52, a spline housing 56 threadedly connected to the upper retaining collar 54, a lower retaining collar 58 threadedly connected to the spline housing 56, and a lower spline member 60 threadedly connected and welded to the lower retaining collar 58.

The shear pin retainer member 44 has a threaded aperture defined at the top thereof for receiving one or more shear pins 62 forming a part of the frangible means 22. The shear pin retainer member 44 also has an aperture defined near the bottom thereof for receiving the set screw(s) 48. The shear pin retainer member 44 has a cylindrical outer surface 64, a cylindrical inner surface 66 having a diameter approximately the same, but slightly larger than, the diameter of the outer surface 38 of the expansion tubing 28. The surface 66 is connected by a tapered surface 68 to another cylindrical inner surface 70 having a larger diameter than the diameter of the surface 66. The surfaces faces 68, 70 define a space in which the flange, having the surfaces 34, 36, of the upper adapter 26 can move when the inner member 18 moves relative to the outer member 20. The shear pin retainer member 44 also includes a radial annular surface 72 extending from the end of the surface 66 opposite the surface 68. The surface 72 provides a shoulder or abutment against which the upper end of the seal means 24 of the preferred embodiment of the present invention rests.

The first seal housing 46 has a substantially cylindrical outer surface 74 in which a groove is defined for receiving an end of a pin 76 threadedly retained in an opening defined in the second seal housing 50. The first seal housing 46 also includes an inner surface 78 having a diameter which is larger than the diameter of the surface 38 of the expansion tubing 28. In the preferred embodiment the surface 78 is spaced from the surface 38 so that an annular region is defined therebetween, which annular region has a cross-sectional area denoted in FIG. 2B by the reference letter A. The first seal housing 46 has another inner surface 80, which is spaced from the surface 78 by a radial annular surface 82. As with the surface 78, the surface 80 is cylindrical. The surface 80 has a greater diameter than the surface 78 so that the surface 80 is farther offset from the surface 38 of the expansion tubing 28. The surface 80 terminates at its other end in a radial annular end wall 84.

The second seal housing 50 has an outer cylindrical surface 86 through which a port or opening 88 is radially defined for communicating with a cylindrical inner surface 90 which terminates at one end in a radial annular surface 82 abutting the end wall 84. The diameter of the surface 90 is greater than the diameter of the surface 80 of the first seal housing 46 so that the surface 90 is the farthest from the surface 38 of the expansion tubing 28 of the three surfaces 78, 80, 90.

The second seal housing 50 has an outside surface 94 which is inwardly offset from the surface 86. The surface 94 has a threaded portion which is intermediate the ends of the second seal housing 50. Connected to this threaded portion of the surface 94 is the upper spline member 52.

The upper spline member 52 has an upper cavity defined by a longitudinal surface 96 and a radial surface 98. The upper spline member 52 has another interior surface 100 which has a larger diameter than the diameter of the surface 38 of the expansion tubing 28. At the end of the upper spline member 52 opposite the cavity defined by the surfaces 96, 98, there are defined a plurality of splines, one of which is identified in FIG. 2D by the reference numeral 102. The splines 102 are configured for mating engagement with the splines 40 of the inner spline member 30.

The upper retaining collar 54 is an internally threaded cylindrical sleeve which couples the upper spline member 52 with the spline housing 56.

The spline housing 56 is a substantially cylindrical sleeve having a hollow interior which houses or covers the splines 40, 102. The spline housing 56 has a cylindrical outer surface 104 and a cylindrical inner surface 106. The cylindrical inner surface 106 has a diameter which is greater than the diameter of the surface 38 of the expansion tubing 28 so that an annular space is defined between the surfaces 38, 106 when the expansion joint is in the position illustrated in FIGS. 2A-2F. It is within this annular region that the splines 40 shown in FIG. 2E travel toward engagement with the splines 102 shown in FIG. 2D.

The spline housing 56 is connected to the lower spline member 60 by the lower retaining collar 58 which is an internally threaded sleeve similar to the upper retaining collar 54.

The lower spline member 60 has an upper spline portion 108 which engages with splines defined on the pin end of the inner spline member 30 when the expansion joint is in the collapsed or retracted position illustrated in FIGS. 2A-2F. The lower spline member 60 terminates at its lower end in a threaded pin end 107 suitably constructed for joining with the packer 8.

The frangible means 22 which fixes the inner member 18 relative to the outer member 20 includes the aforementioned shear pin(s) 62 having a shear force capability which, when exceeded, causes the shear pin(s) 62 to break thereby permitting relative movement between the inner member 18 and the outer member 20. The frangible means 22 also includes a shear pin sleeve 110 having a cylindrical shape with a cross-sectional area which is sufficient to be received in the annular space defined between the surface 32 of the upper adapter 26 and the surface 70 of the shear pin retainer member 44 adjacent the radial annular surface 34. It is to be noted that with this construction of the preferred embodiment there can be some limited relative movement between the inner member 18 and the outer member 20 even when the shear pin 62 and the shear pin sleeve 110 are in place; however, this degree of movement is limited so that the inner and outer members 18, 20 may be said to be relatively longitudinally fixed. This limited degree of movement extends between an uppermost position of the inner member 18 wherein the surface 34 abuts an annular surface 112 of the shear pin sleeve 110 and a lowermost position of the inner member 18 wherein the tapered surface 68 is engaged by the lower end of the upper adapter 26 or wherein the upper splined portion 108 and the inner spline member 30 fully mesh. When the surface 34 abuts the surface 112, continued upward pulling of the inner member 18 will cause the shear pin(s) 62 to break when that pulling force exceeds the shear force capability of the pin(s) 62. When this shearing occurs, the inner and outer members 18, 20 will be relatively movable to their entire extents as limited only by the spacing between the splines 40, 102. The pin(s) 62 can also be broken in response to other suitable forces, such as a sufficient force resulting from a contraction of the tubing string 4 to be compensated by an extension of the inner member 18 relative to the outer member 20 when both ends of the tubing string 4 are firmly anchored, for example.

Figures 2A, 2B:
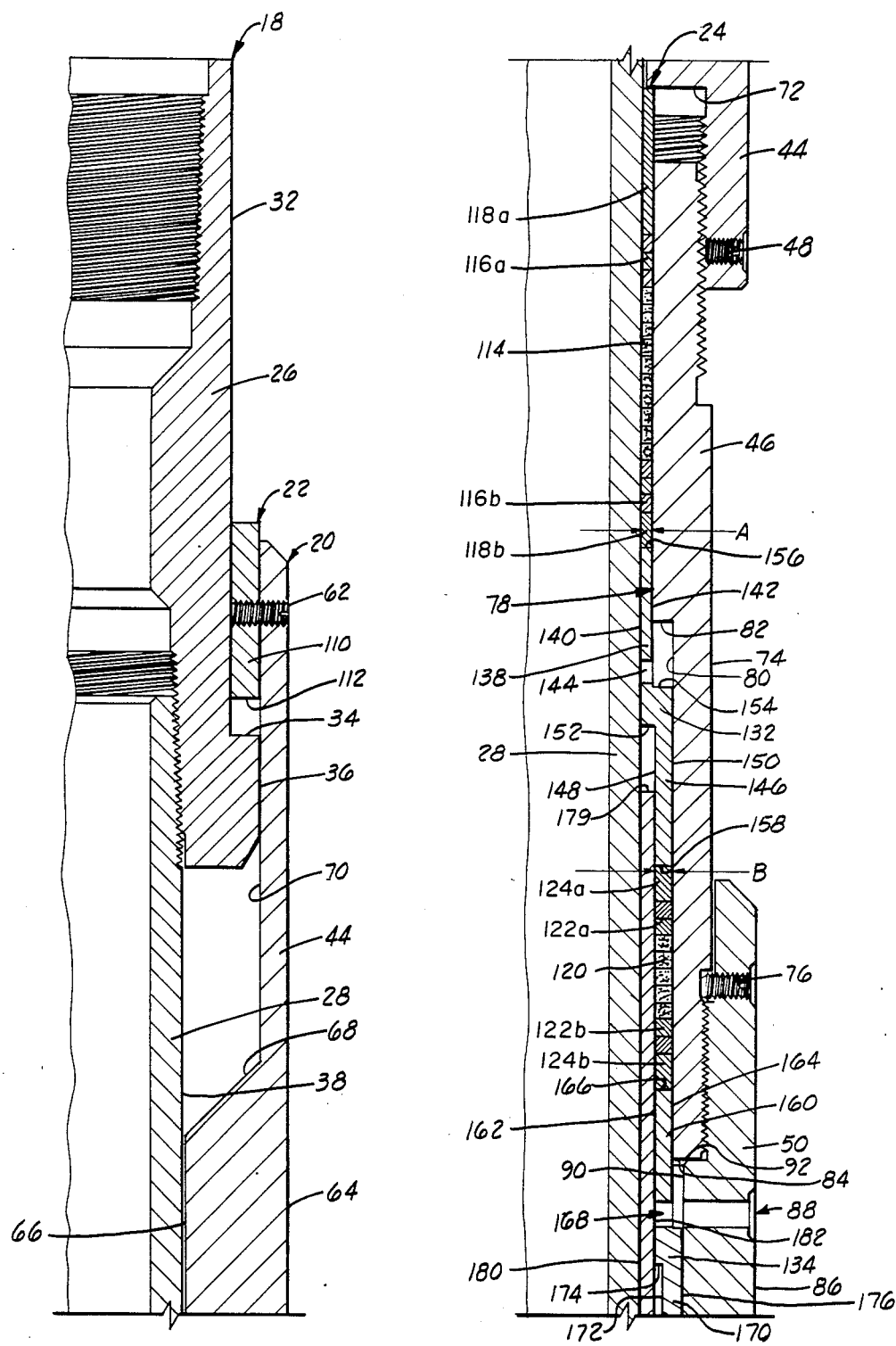

With reference to FIGS. 2B-2C, the seal means 24 will be described. Broadly, the seal means 24 of the preferred embodiment includes a primary seal means for fluid-tightly engaging an outer surface of the inner member 18 and an inner surface of the outer member 20. In the preferred embodiment these surfaces are specifically surface 38 of the expansion tubing 28 and the surface 78 of the first seal housing 46. The seal means 24 also includes back-up seal means for exerting a net compressive force on the primary seal means. The seal means 24 also includes biasing means for providing a biasing force on the back-up seal means in a direction toward the primary seal means.

FIG. 2B shows that the primary seal means comprises a seal member including a packing substance 114 having copper foil backup elements 116a and 116b and metallic spacers 118a and 118b disposed at the ends of the packing substance 114. These elements of the primary seal means define a hollow cylindrical shape having a cross-sectional area A which is defined by the spacing between the sealing surfaces 38, 78. In the preferred embodiment, the packing substance 114 is an abradable substance such as graphite impregnated asbestos rope packing. One type of suitable packing is Rabestos Manhatan RM 325 packing. In the preferred embodiment, at least two turns of copper backing are used in the back-up elements 116a and 116b for withstanding compressive forces in excess of the capability of the primary packing substance 114 to prevent extrusion of the packing substance 114.

The upper spacer 118a has its upper edge abutting the surface 72 of the shear pin retainer member 44. This end of the spacer 118, and thus of the primary seal means, receives, or is acted upon by, the annular pressure which is present outside the unsealed, threadedly connected joint between the shear pin retainer member 44 and the first seal housing 46 when the invention is disposed in a well. The lower spacer 118b receives the tubing pressure which is present due to a lack of a fluid seal along the outer surface 38 of the expansion tubing 28 below the lower end of the primary seal means defined at the bottom edge of the lower spacer 118. Therefore, the force acting on the primary seal, which will be referred to as seal A, equals $(P_i - P_o)$ (area A) where "$P_i$" equals the tubing pressure and "$P_o$" equals the annular pressure and "area A" equals the cross-sectional area of the seal A. When $P_i$ is greater than $P_o$ and assuming that both the primary seal means and the back-up seal means are properly preloaded and initially sealing, the resultant force tends to compress the seal A against the surface 72 and outwardly against the sealing surfaces 38, 78 thereby providing a fluid-tight boundary between the inner member 18 and the outer member 20 whereby the annular fluid or pressure is not communicated with the interior fluid or pressure between the inner and outer members 18, 20.

Because the seal A abrades or wears away in response to the relative movement between the inner and outer members 18, 20, the seal A can be referred to as a dynamic seal which is relatively continually changing as the dynamic action between the inner and outer members 18, 20 occurs. Although the $(P_i - P_o)$ (area A) compressive force acts in a direction to maintain the seal established by the packing substance 114, this force must be backed up to insure a continued fluid-tight seal as more and more of the packing substance 114 wears away. This back-up force is provided by the back-up seal means.

The back-up seal means is responsive to a pressure differential between the interior tubing pressure, $P_i$, and the exterior annular pressure, $P_o$, so that a net compressive force is exerted on the primary seal A when $P_i$ exceeds $P_o$. Physically, the backup seal means moves closer to the primary seal means A as the packing substance 114 abrades so that the remaining packing substance is continually compressed against the inner and outer sealing surfaces to maintain the primary seal. Although the back-up seal means does physically move, it is considered to be a static seal in that it does not undergo the abrading action experienced by the primary seal resulting from the relative movement between the inner member 18 and the outer member 20.

More particularly, the back-up seal means includes a seal member B comprising a packing substance 120 retained on both ends by respective copper foil backing elements 122a and 122b and metallic spacers 124a and 124b. The seal member defined by the elements 120, 122a and 122b, 124a and 124b has a hollow cylindrical shape with a cross-sectional area B as labeled in FIG. 2B. The cross-sectional area B is greater than the cross-sectional area A of the primary seal means. The tubing pressure and annular pressure act across the area B in directions reversed from those in which these pressures act on the primary seal A. That is, the tubing pressure, $P_i$, acts downward on the upper spacer 124b whereas the annular pressure, $P_o$, acts upward on the lower spacer 124. Therefore, the net force acting on the seal member comprising the elements 120, 122a and 122b, 124a and 124b is $(P_i - P_o)$ (area B) and is directed oppositely, or negatively, as compared to the $(P_i - P_o)$ (area A) force acting on the primary seal A.

The back-up seal means also includes another seal member which is illustrated in FIG. 2C. This seal member will be referred to as seal member C because it has a cross-sectional area labeled C in FIG. 2C, which area is defined by a suitable packing substance 126 retained at both ends by suitable back-up elements 128a and 128b and spacers 130a and 130b. The composition of seal member C, as well as seal member B, is comparable to the composition of seal member A. As with the seal members A, B, the seal member C has a hollow cylindrical shape. Also as with the seal members A, B, the seal member C has the interior pressure, $P_i$, and the exterior pressure, $P_o$, acting across its cross-sectional area C, which cross-sectional area is greater than either the area A or the area B. The forces resulting from this action equal $(P_i - P_o)$ (area C). The direction of this force is in the same direction as the $(P_i - P_o)$ (area A) force acting on the seal A, but opposite the direction of the $(P_i - P_o)$ (area B) force acting on the seal B.

The back-up seal means also includes coupling means for coupling the seal members B, C in force transferring association with the primary seal member A. In the preferred embodiment the coupling means includes sleeve means for defining a space in which the seal member B is disposed and for defining another space in which the seal member C is disposed. More particularly, the coupling means includes an offset member 132 extending between the seal member A and the seal member B. The coupling means also includes an offset member 134 extending between the seal member B and the seal member C. The coupling means also includes a support member 136 for supporting the seal member B between the offset members 132, 134 and for supporting the seal member C adjacent the offset member 134.

The offset member 132 has a first leg portion 138 having an inner diameter substantially equal to the outer diameter of the inwardly adjacent surface 38 and an outer diameter substantially equal to the diameter of the outwardly adjacent surface 78. The word "substantially" is used because there is, of course, some tolerance to permit a sliding relationship between the leg portion 138 and the surfaces 38, 78. The leg portion 138 has an annular shape and includes a radial port or opening 144 extending between the surfaces 140, 142 so that there is pressure communication from adjacent the surface 38 to the surfaces 80, 82. Because the surface 140 has a diameter substantially equal to the diameter of the surface 38 and the surface 142 has a diameter substantially equal to the diameter of the surface 78, the leg portion 138 has a cross-sectional area approximately equal to the cross-sectional area A.

The offset member 132 also includes another leg portion 146 integrally formed with, but offset from, the first leg portion 138. The leg portion 146 has an inner surface 148 having a diameter greater than the diameter of the inwardly adjacent surface 38 so that an annular space is defined therebetween. The leg portion 146 includes an outer surface 150 having a diameter substantially equal to the diameter of the outwardly adjacent surface 80, but for a suitable tolerance permitting a sliding relationship between the first leg portion 146 and the first seal housing 46. The surface 148 is offset from the surface 140 by a radial annular surface 152, and the surface 150 is offset from the surface 142 by a radial annular surface 154.

The offset member 132 terminates at a surface 156 abutting the lower spacer 118b of the seal A and at a surface 158 abutting the upper spacer 124a of the seal B.

The surface 158 has a cross-sectional area approximately equal to the area B.

The offset member 134 includes a leg portion 160 having an interior surface 162 having a diameter equal to the diameter of the surface 148. The leg portion 160 also includes an outer surface 164 having a diameter equal to the diameter of the surface 150. The surface 164 lies, in part, adjacent the surface 80 of the first seal housing 46. This construction defines the leg portion 160 as an annular shape having a cross-sectional area approximately equal to the area B. The leg portion 160 terminates at its upper end at a surface 166 abutting the lower spacer 124b of the seal B. The leg portion 160 has an opening or port 168 defined between the surfaces 162, 164 in fluid communication with the port or opening 88 defined through the second seal housing 50. As shown in FIG. 2B, there is no fluid-tight seal along either the surface 162 or the surface 164 from the ports 88, 168 to the seal B; therefore, the annular pressure, $P_o$, is exerted upwardly against the lower spacer 124 of the seal B.

The offset member 134 includes another leg portion 170 integrally formed with, but spaced from, the leg portion 160. The leg portion 170 has an inner surface 172 spaced from the surface 162 by a radial annular surface 174 so that the diameter of the surface 172 is greater than the diameter of the surface 162. The leg portion 170 has an outer surface 176 which is approximately equal to the diameter of the outwardly adjacent surface 90 of the seal housing 50, "substantially" again indicating there is some tolerance for permitting a slidable relationship between the surfaces 176, 90. The surfaces 172, 176 define an annular shape having a cross-sectional area approximately equal to the area C. The leg portion 170 terminates in an end surface 178 abutting the upper spacer 130a of the seal C. As shown in FIGS. 2B and 2C, there are no seals along the surfaces 162, 172, 176 from the ports 88, 168 to the seal C; therefore, the annular pressure, $P_o$, is exerted downwardly against the upper spacer 130 of the seal C.

The support member 136 has a radial annular end surface 179 which faces the surface 152 of the offset member 132. The support member 136 has an inner surface 180 having a diameter approximately equal to the diameter of the inwardly adjacent surface 38 but sufficiently different that the two are movable or slidable relative to each other. Because there is no seal between the surface 180 and the surface 38, the tubing pressure, $P_i$, acts downwardly against the upper spacer 124a of the seal B. The member 136 has an outer surface 182 having a diameter approximately equal to the diameters of the surfaces 148, 162. The surface 182 is disposed adjacent at least a part of the surface 148, adjacent the inner surface of the seal member B, and adjacent the surface 162. FIG. 2C shows that the member 136 has another outer surface 184 having a diameter approximately equal to the diameter of the surface 172. The surface 184 is disposed adjacent at least a part of the surface 172 and adjacent the interior surface of the seal member C. The surface 184 is spaced radially outwardly from the surface 182 by a radial annular surface 186 which faces the radial annular surface 174 of the offset member 134. Spaced radially from the surface 184 by a radial annular surface 188 is another outer surface 190 of the member 136. The surface 190 has a diameter approximately equal to the diameter of the outwardly adjacent surface 90. The radial annular surface 188 abuts the lower spacer 130b of the seal C as shown in FIG. 2C. There is no seal between the surface 190 and the surface 90 so that the tubing pressure, $P_i$, acts upwardly against the lower spacer 130b of the seal C. The surface 190 terminates at its lower edge at the lower end of the member 136. This lower end can be recessed for receiving a spring 192 forming a part of the biasing means of the preferred embodiment of the present invention.

Figure 3:
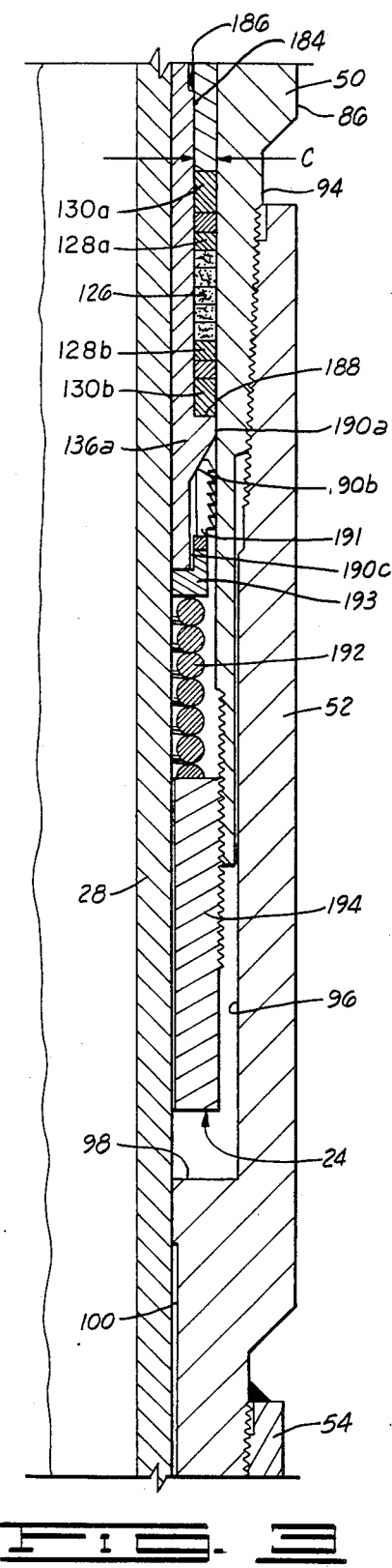
FIG. 3 is a partial sectional view of another preferred embodiment of a portion of the section of the expansion joint shown in FIG. 2C.

Another preferred embodiment of the support member 136 is shown in FIG. 3. This support member is designated by the reference numeral 136a. The support member 136a has similar features to the support member 136 and is used with similar components of the other preferred embodiment as indicated by the same reference numerals used in FIG. 3. The difference in the support member 136a is in its lower end portion which has three outer surfaces 190a, 190b, 190c (instead of the single-diameter surface 190 of the support member 136) and which is associated with an internal slip member 191 and a retaining member 193. The surface 190a has a diameter substantially equal to the diameter of the outwardly adjacent surface 90. The surface 190b tapers inwardly from the surface 190a to the surface 190c. The surface 190c has a diameter which is less than the diameter of the surface 90 so that a space is defined therebetween for receiving the slip member 191, which has a generally annular shape. The slip member 191 is retained in this space by the retaining member 193 which is engaged by the spring 192. The retaining member 193 has a recess with a diameter approximately equal to the diameter of the surface 190c so that the lower end of the support member 136a is received in the recess of the retaining member 193. Utilization of this construction which includes the slip member 191 prevents relaxing of the loading forces acting on the seals during a cooldown or low pressure cycle, thereby maintaining a bias to prevent adverse movement or relaxation of the seals.

The spring 192 is mounted coaxially on the expansion tubing 28. The spring 192 is retained adjacent the member 136 by an adjustable nut 194 threadedly retained to the second seal housing 50. The compression of the spring 192 can be adjusted by adjusting the degree to which the nut 194 is threaded into the second seal housing 50. The biasing means provided by the spring 192 and the nut 194 exerts a preload biasing force on the seal members B, C and thus on the coupled seal member A to establish an initial seal so that the seal members will respond when a differential pressure is applied. Other embodiments of biasing means, such as ratchet mechanisms, can be used.

The operation of the present invention will be described first with reference to the general operation of the expansion joint depicted in FIGS. 2A–2F and second with respect to the sealing mechanism itself.

The expansion joint is shown in FIGS. 2A–2F in its collapsed state with the inner spline member 30 engaging the lower spline member 60 so that when torque is applied to the inner member 18, the outer member 20 rotates therewith. The expansion joint is held in this collapsed position by the frangible means 22. This is the position in which the expansion joint is run into the borehole when a hot-to-cold temperature change is anticipated because as the colder temperature is encountered, the tubing string will contract thereby moving the inner member 18 upward toward an extended position which is fully reached when the splines 40 engage the splines 102. The expansion joint can be run into the hole or otherwise utilized in the extended position when a cold to hot temperature change is anticipated because then the tubing string will tend to expand, thereby necessitating compensation by means of a shrinking or collapsing expansion joint wherein the splines 40 move away from the splines 102 toward the lower spline member 60; however, it is contemplated that the expansion joint will generally be run into the hole in its collapsed position in any event to minimize relative movement between the parts and thus to minimize the wear on the seals during transportation and running into the hole, but this is not required.

Once the expansion joint has been lowered into the borehole to a position adjacent the packer 8, the tubing string 4 is rotated which, because of the splined connections, rotates the outer member 20, thereby causing the threaded pin end 106 to engage a mating joint associated with the packer 8. Alternatively, the packer 8 can be connected to the expansion joint at the surface and lowered therewith into the well to the location at which the packer is to be set. The expansion joint may also be built as an integral part of the packer device.

Once the expansion joint is seated in the properly positioned packer 8, an upward force can be applied to the tubing string to break the shear pin(s) 62 if the expansion joint is in its fixed, collapsed position. Alternatively, the shear pin(s) 62 can be left in place for breakage upon a suitable force arising from contraction of the tubing string or pressures within the borehole, for example, acting on the expansion joint elements.

Once the shear pin(s) 62 is (are) broken, the inner member 18 is free to move between its collapsed and extended position to compensate for length changes in the tubing string 4. It is this movement of the inner member against the primary seal A that abrades the packing substance 114. This abrasion is compensated for by the following operation of the seal mechanism of the present invention.

Through the operation of the sealing mechanism of the present invention, the loss of packing material in the primary seal A is compensated. The tightness of the primary seal A is also enhanced by the present invention because it places an increasing load, or force, on the primary seal A as the differential pressure across the element increases. The enhancement is provided by the pressure differentials acting across the seal members B, C relative to the pressure differential acting on the seal A. As previously mentioned, the forces acting at seal A equal $(P_i-P_o)$ (area A), the forces acting at seal B equal $(P_i-P_o)$ (area B) (in a negative direction relative to the forces acting on area A), and the forces acting at seal C equal $(P_i-P_o)$ (area C) (in a positive direction relative to the forces acting on seal A). Therefore, the sum of these forces acting on seal A equals:

$$(P_i-P_o) \text{ (area } A) + (P_i-P_o) \text{ (area } C) - (P_i-P_o) \text{ (area } B).$$

Analysis shows that the forces acting on the seal member B and the seal member C provide a constant back-up to the seal member A if $P_i$ is greater than $P_o$. Remembering that area C is greater than area B, the net force acting on the seal members B, C will tend to transfer loading to the primary seal A since the positive $(P_i-P_o)$ (area C) force is greater than the negative $(P_i-P_o)$ (area B) force. The preload force provided by the biasing means will provide a further back-up by keeing relatively non-abrading seal members B, C tightly compressed.

The foregoing analysis also indicates that a larger compressive back-up force is provided as the pressure differential between $P_i$ and $P_o$ increases. This makes for a more efficient seal because the packing substance is held tighter with increasing pressures, thereby avoiding leakage.

In high temperature tests, the pressure-assisted dynamic sealing mechanism of the present invention has held a pressure of 5,000 pounds per square inch at 700° F., levels where prior preloaded single-gland seals have failed.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompassed within the spirit of this invention as defined by the appended claims.

What is claimed is:

1. A pressure-assisted dynamic seal apparatus for providing a seal between first and second members, said seal apparatus comprising:
   first seal means for engaging said first and second members, said first seal means having a first cross-sectional area;
   second seal means, disposed between said first and second members, for receiving from a first direction a first pressure associated with said first member and for receiving from a second direction a second pressure associated with said second member, said second seal means has a second cross-sectional area greater than said first cross-sectional area;
   third seal means, disposed between said first and second members, for receiving from said first direction said second pressure and for receiving from said second direction said first pressure, said third seal means has a third cross-sectional area greater than said second cross-sectional area; and
   coupling means for coupling said second and third seal means in force transferring association with said first seal means.

2. The apparatus of claim 1, wherein:
   said first seal means receives from said first direction said second pressure and receives from said second direction said first pressure; and
   said apparatus further comprises biasing means for providing a biasing force in said second direction.

3. The apparatus of claim 2, wherein said coupling means includes:
   a first offset member extending between said first seal means and said second seal means, said first offset member including:
      a first leg engaging said first seal means and having a cross-sectional area approximately equal to said first cross-sectional area; and
      a second leg, connected to but offset from said first leg, engaging said second seal means and having a cross-sectional area approximately equal to said second cross-sectional area;
   a second offset member extending between said second seal means and said third seal means, said second offset member including:
      a third leg engaging said second seal means and having a cross-sectional area approximately equal to said second cross-sectional area; and
      a fourth leg, connected to but offset from said third leg, engaging said third seal means and having a cross-sectional area approximately equal to said third cross-sectional area; and
   support means for supporting said second seal means between said first and second offset members and for supporting said third seal means adjacent said second offset member.

4. The apparatus of claim 1, wherein said coupling means includes:
   a first offset member extending between said first seal means and said second seal means, said first offset member including:
      a first leg engaging said first seal means; and
      a second leg, connected to but offset from said first leg, engaging said second seal means;
   a second offset member extending between said second seal means and said third seal means, said second offset member including:
      a third leg engaging said second seal means; and
      a fourth leg, connected to but offset from said third leg, engaging said third seal means; and
   support means for supporting said second seal means between said first and second offset members and supporting said third seal means adjacent said second offset member.

5. The apparatus of claim 4, wherein:
   said first seal means receives from said first direction said second pressure and receives from said second direction said first pressure; and
   said apparatus further comprises biasing means for providing a biasing force in said second direction.

6. A pressure-assisted dynamic seal apparatus, comprising:
   an inner member;
   an outer member having said inner member slidably disposed therein so that said inner and outer members are movable relative to each other; and
   seal means for maintaining a fluid-tight seal between said inner and outer members as said inner and outer members are moved relative to each other and as at least a portion of said seal means is abraded in response to such relative movement, said seal means including:
      primary seal means, responsive to a compressive force, for fluid-tightly angaging an outer surface of said inner member and an inner surface of said outer member, said primary seal means includes a first packing substance disposed between said inner and outer members, said first packing substance having a first cross-sectional area; and
      back-up seal means, responsive to a pressure differential between an interior pressure inside of said inner member and an exterior pressure outside of said outer member, for exerting a net compressive force on said primary seal means when said interior pressure exceeds said exterior pressure, said back-up seal means includes:
         a second packing substance disposed between said inner and outer members, said second packing substance having a second cross-sectional area greater than said first cross-sectional area;
         a third packing substance disposed between said inner and outer members, said third packing substance having a third cross-sectional area greater than said second cross-sectional area; and coupling means for coupling said second and third packing substances in force transferring association with said first packing substance.

7. The apparatus of claim 6, wherein said second and third packing substances are disposed between said inner and outer members so that said exterior pressure acts between said second and third packing substances and said interior pressure acts on said second and third substances in opposition to said exterior pressure.

8. The apparatus of claim 6, wherein said seal means further includes biasing means for exerting a biasing force on said second and third packing substances toward said first packing substance.

9. The apparatus of claim 6, wherein said seal means further includes biasing means for exerting a biasing force on said back-up seal means.

10. A pressure-assisted dynamic seal apparatus, comprising:
   tubular mandrel means for receiving a first fluid under a first pressure;
   housing means for telescopically receiving interiorly thereof said mandrel means and for receiving exteriorly thereof a second fluid under a second pressure;
   first seal means, responsive to said first and second pressures, for providing a primary seal between said mandrel means and said housing means so that said first fluid is not communicated with said second fluid between said mandrel means and said housing means, said first seal means including a first seal member having a first area across which said first and second pressures act; and
   second seal means for providing a back-up force to said first seal means when said first pressure is greater than said second pressure, said second seal means including:
      a second seal member having a second area across which said first and second pressures act, said second area being greater than said first area;
      a third seal member having a third area across which said first and second pressures act, said third area being greater than said second area; and
      sleeve means extending between said first seal member and said second and third seal members, said sleeve means defining a first space in which said second seal member is disposed and defining a second space in which said third seal member is disposed.

11. The apparatus of claim 10, wherein said sleeve means includes:
   a first offset member extending between said first seal member and said second seal member, said first offset member including:
      a first leg engaging said first seal member; and
      a second leg, connected to but offset from said first leg, engaging said second seal member;
   a second offset member extending between said second seal member and said third seal member, said second offset member including:
      a third leg engaging said second seal member; and
      a fourth leg, connected to but offset from said third leg, engaging said third seal member; and
   support means for supporting said second seal member between said first and second offset members and supporting said third seal member adjacent said second offset member.

12. The apparatus of claim 11, wherein:
   said first leg extends from said first seal member adjacent said mandrel means and adjacent a first surface of said housing means, but spaced from a second surface of said housing means, said first leg having a first opening defined therethrough in communication with the space defined between said first leg and said second surface of said housing means;
   said second leg extends from said first leg to said second seal member adjacent said second surface of said housing, but spaced from said mandrel means;
   said third leg extends from said second seal member adjacent said second surface of said housing means, but spaced from a third surface of said housing means, said third leg having a second opening defined therethrough;
   said fourth leg extends from said third leg to said third seal member adjacent said third surface of said housing means;
   said support means includes a member having an interior surface disposed adjacent said mandrel means, a first outer surface disposed adjacent said second seal member and said third leg and at least a portion of said second leg, and a second outer surface disposed adjacent said third seal member and at least a portion of said fourth leg, said member being slidable relative to said first and second offset members; and
   said housing means has a third opening defined therein for communicating said second pressure to said second opening of said third leg.

13. The apparatus of claim 12, further comprising biasing means for exerting a biasing force on said member of said support means.

14. The apparatus of claim 13, wherein said mandrel means and said housing means include mating spline means for enabling said housing means to rotate when said mandrel means is rotated.

15. The apparatus of claim 14, further comprising frangible means for retaining said mandrel means and said housing means in a relatively fixed longitudinal relationship until said frangible means is broken.

16. The apparatus of claim 10, wherein:
   said second seal means includes:
      a negative component seal member having a cross-sectional area across which said first and second pressures act; and
      a positive component seal member having a cross-sectional area across which said first and second pressures act; and
   the forces acting across a cross-sectional area of said first seal means are equal to:

$$(P_i - P_o)(\text{area } A) + (P_i - P_o)(\text{area } C) - (P_i - P_o)(\text{area } B)$$

where
$P_i$ = said first pressure,
$P_o$ = said second pressure,
area A = said cross-sectional area of said first seal means,
area B = said cross-sectional area of said negative component seal member, and
area C = said cross-sectional area of said positive component seal member.

17. The apparatus of claim 10, wherein:
   said first seal means includes an abradable substance which wears away in response to said mandrel means moving relative to said housing means; and
   said second seal means moves closer to said first seal means in response to said abradable substance wearing away so that the remainder of the abradable substance is continually compressed against both said mandrel means and said housing means to maintain said primary seal therebetween.

* * * * *